United States Patent [19]
Näff et al.

[11] Patent Number: 6,039,502
[45] Date of Patent: Mar. 21, 2000

[54] METHOD OF FORMING A FORMLOCKING CONNECTION OF TWO TELESCOPIC TUBES AND A FORMLOCKING CONNECTION FORMED THEREBY

[75] Inventors: Dominik Näff, Triesen, Liechtenstein; René Lörenz, Dornbirn, Austria

[73] Assignee: Etablissement Supervis, Vaduz, Liechtenstein

[21] Appl. No.: 08/942,081

[22] Filed: Oct. 1, 1997

[30] Foreign Application Priority Data

Oct. 2, 1996 [DE] Germany ............... 196 40 776

[51] Int. Cl.⁷ ....................................... F16B 7/00
[52] U.S. Cl. ................ 403/282; 403/277; 403/290; 280/777; 29/512; 29/523; 74/492
[58] Field of Search ........................ 403/282, 281, 403/280, 279, 277, 274, 289, 290, 375; 29/523, 512, 513; 280/777, 775; 74/492, 493

[56] References Cited

U.S. PATENT DOCUMENTS

| | | | |
|---|---|---|---|
| 2,857,665 | 10/1958 | Cohen | 29/513 |
| 3,279,051 | 10/1966 | Minshall | 29/512 X |
| 3,413,021 | 11/1968 | Potts | 29/523 X |
| 3,786,730 | 1/1974 | Linderholm | 29/512 X |
| 4,334,703 | 6/1982 | Arthur et al. | 29/523 X |
| 4,641,684 | 2/1987 | DeLord | 29/513 X |
| 5,158,432 | 10/1992 | Cox | 29/513 X |
| 5,669,633 | 9/1997 | Naff et al. | 280/777 |

*Primary Examiner*—Harry C. Kim
*Attorney, Agent, or Firm*—Brown & Wood, LLP

[57] ABSTRACT

A method of forming a formlocking connection of two telescopic tubes and including providing in one of the two tubes at two diametrically opposite locations, elongate cut-outs, with the cut-outs having their respective end sides limited by at least one web, providing in another one of the two tubes, at two diametrically opposite locations, longitudinally extending strips extending from an end surface of the another one of the two tubes, inserting into the elongate cut-outs of the one of the two tubes, a forming tool, and thereafter, telescopically connecting the two tubes and pushing the two tubes toward each other so that the strips are pressed against the forming tool which causes the strips to roll over the webs, and a formlocking connection obtained by this method.

14 Claims, 3 Drawing Sheets

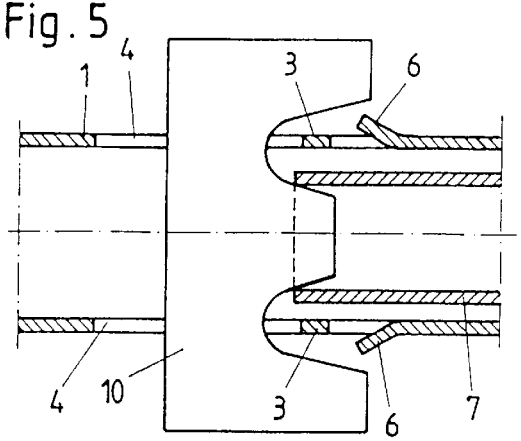
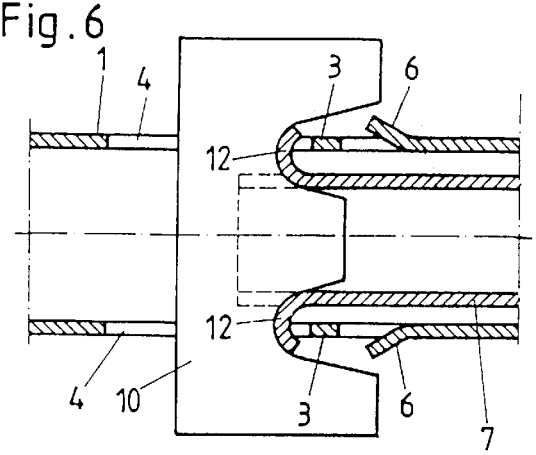
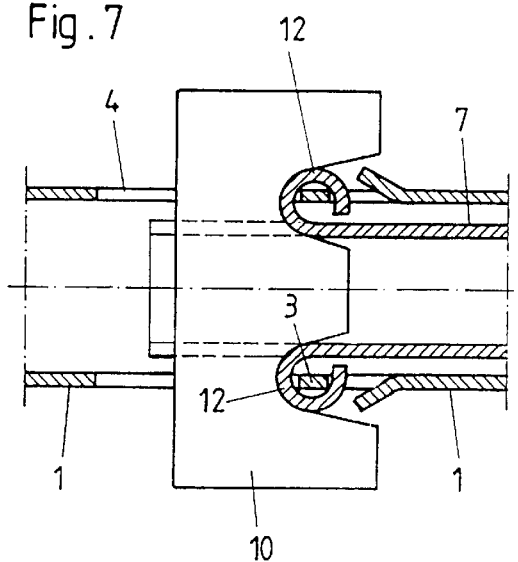
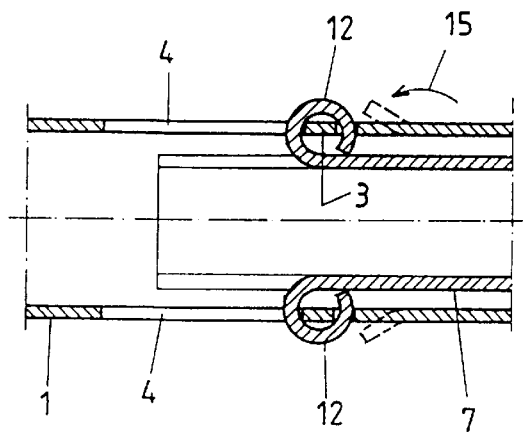
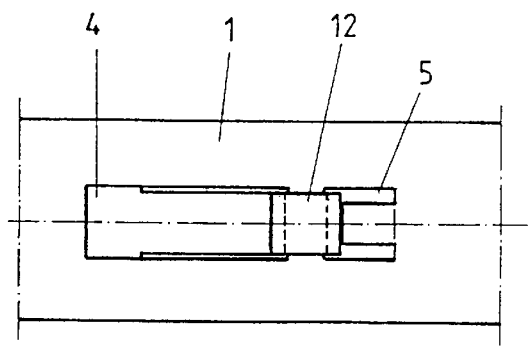
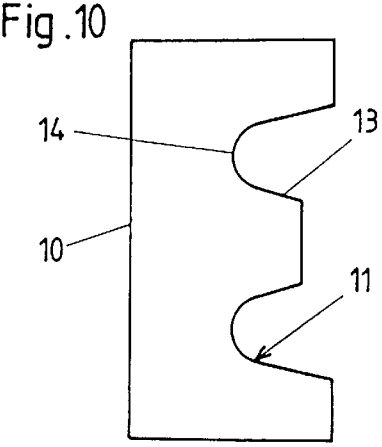
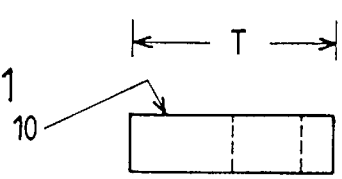

METHOD OF FORMING A FORMLOCKING CONNECTION OF TWO TELESCOPIC TUBES AND A FORMLOCKING CONNECTION FORMED THEREBY

BACKGROUND OF THE INVENTION

1. Field of the Invention

The present invention relates to a method of forming a formlocking connection of two telescopic tubes and a formlocking connection formed thereby.

2. Description of the Prior Art

Two telescopic tubes can be used, e.g., for forming a steering column of a motor vehicle. At that, the two tubes are so arranged relative to each other that in case of an accident, a frontal collision, they are pushed toward each other. Thereby, it is insured that in the case of a frontal collision, the steering column does not present a danger for the driver. The steering columns should be cheap in production, and for their manufacture, the use of simple, inexpensive semi-finished workpieces should become possible. The machinery processes should be reduced to a minimum in order to keep the manufacturing costs low. Despite of being formed of two parts, the steering columns should not have any rotational backlash. In addition, the steering column, as it has already been discussed above, should be able to reduce its length when a predetermined force is applied to the column as a result of a collision, with the length reduction being effected by displacement of the two tubular parts of the column toward each other.

There exist two type of motor vehicle steering columns. In one type, in case of a collision, the impact energy is transformed into work of deformation. In another type, in case of a collision, the impact energy is converted into friction and is thereby converted into heat energy. The two types of the motor vehicle steering columns are disclosed in numerous publications. Thus, e.g., the first type of a motor vehicle steering column, in which the impact energy is transformed into work of deformation, is disclosed in German publication No. 4,017,995, British Patent No. 1,156, 426 and U.S. Pat. No. 3,504,567. However the structure of the steering column disclosed in the above-mentioned documents is very expensive, as is the process for its manufacture.

Accordingly, an object of the present invention is a method of manufacturing a steering column, in which the impact energy is transformed into work of deformation, which is inexpensive and can be effected with the use of simple tools.

Another object of the present invention is a form locking connection of tubular parts forming the steering column, which insures a backlash-free connection of the two tubular parts.

SUMMARY OF THE INVENTION

These and other objects of the present invention, which will become apparent hereinafter, are achieved by formlockingly connecting the two telescopic tubes, which form the steering column, by a process which includes providing in one of the tubes, at two diametrically opposite locations, elongate cut-outs, with the cut-outs having their end sides limited by a at least one web, providing in another one of the two tubes, at two diametrically opposite locations, longitudinally extending strips extending from an end surface of the another one of the two tubes, inserting into the elongate cut-outs of the two tubes, a forming too and thereafter, telescopically connecting the two tubes and pushing the two tubes toward each other so that the strips are pressed against the forming tool which causes the strips to roll over the webs.

DESCRIPTION OF THE DRAWINGS

The features and objects of the present invention will become more apparent, and the invention itself will be best understood from the following detailed description of the preferred embodiments when read with reference to the accompanying drawings, wherein:

FIGS. 5–8 are longitudinal cross-sectional views showing consecutive steps of connecting outer and inner tubes according to the present invention;

FIG. 9 is a plan view of the connection location formed as shown in FIG. 8;

FIG. 10 is an elevational view of the forming tool used for formlockingly connecting the two tubes according to the present invention;

FIG. 11 is a plan view of the tool shown in FIG. 10;

DETAILED DESCRIPTION OF THE PREFERRED EMBODIMENT

Figure 1:
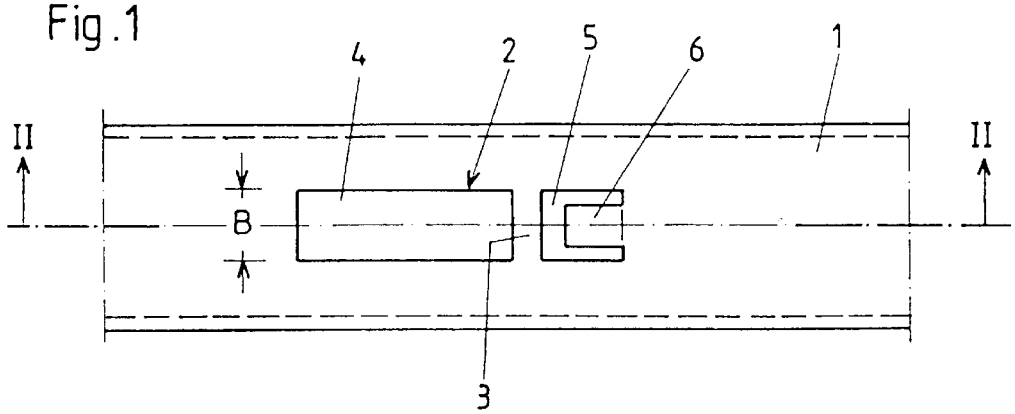
FIG. 1 is a plan view of a section of an outer tube.

An outer tube 1, which may be used, e.g., for forming a steering column of a motor vehicle, has two elongate cut-outs 2 provided at two diametrically opposite locations, respectively. Each cut-out 2 is divided by a web 3 in two sections 4 and 5 having different length. The shorter section 5 includes a tongue 6 facing the web 3.

A second inner tube 7, which likewise may be used for forming a steering column of a motor vehicle, has, at two diametrically opposite locations, pairs of weakness regions 9 which can be obtained either by machining or by stamping. These linear weakness regions extend in a longitudinal direction of the inner tube 7.

The outer and inner tubes 1 and 7 are connected with each other to form steering column. At that, the tongue 6 in the smaller section 5 is slightly bent outwardly. For formlockingly connecting the two tubes 1 and 7, a forming tool 10 is used, the elevational and plan views of which are shown in FIGS. 10 and 11, respectively. The forming tool 10 is inserted only through the larger section 4 of the cut-out 2 into the tube 1 and is retained there. Then, the inner tube 7 is inserted into the outer tube 1 and is pushed against the forming tool 10. The inner tube 7 is so positioned in the outer tube 1 that the cut-outs 2 coincides with strips 12 which are defined by weakness regions 9 of the inner tube 7. The end surfaces of the strips 12 slide along the tool 10 along forming surfaces 11 of the tool 10, which are defined by a wedge-like projection 13 of the tool 10. The strips 12, which slide along the opposite wedge-shaped surfaces of the projection 13 of the tool 10 are teared along the weakness regions 9 and are bent outwardly by bending surfaces 14 of the tool 10 and are flanged out, as shown in FIGS. 5 and 6. The bent-out strips 12 surround the web 3, as shown in FIG. 7, so that the web 3 is formlockingly held by the bent strips 12. Then, a pressure is applied to the bent-out tongues 6 in directions shown in FIG. 8 by an arrow 15, and the tongues 6 are pushed downwardly, engaging the strips 12 with their end surfaces. Then, the forming tool 10 is displaced axially away from the connection location and is removed in direction transverse to the tube longitudinal axis. The longitudinal extent of the section 4 of the cut-out 2 is somewhat greater than the width T of the forming tool 10. The longitudinal extent of the weakness regions 9 is larger than the flanged portions of the strips 12, so that, in case of a collision, an additional section of the weakness region 9 is teared off due to the displacement of the outer tube 1 and the inner tube 7 toward each other. Thereby, energy dissipation takes place as is desired in steering columns of motor vehicles.

In the above-discussed embodiment, the elongate cut-outs 2 are formed in the outer tube 1. However, a connection of two tubes, in which the flanged strips are formed in the outer tube and the cut-outs are formed in the inner tube, is also possible. Such a connection of two tubes is also encompassed by the scope of the present invention. When there are two tubes movable toward one another, it is within scope of the invention to retain any of the two tubes stationary and to move another of the two tubes toward the stationary retained tube.

Figure 2:
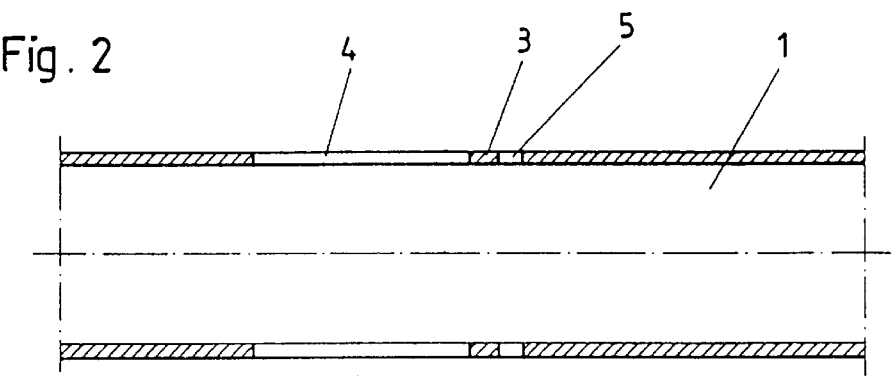
FIG. 2 is a longitudinal cross-sectional view along line II—II in FIG. 1.
Figure 3:
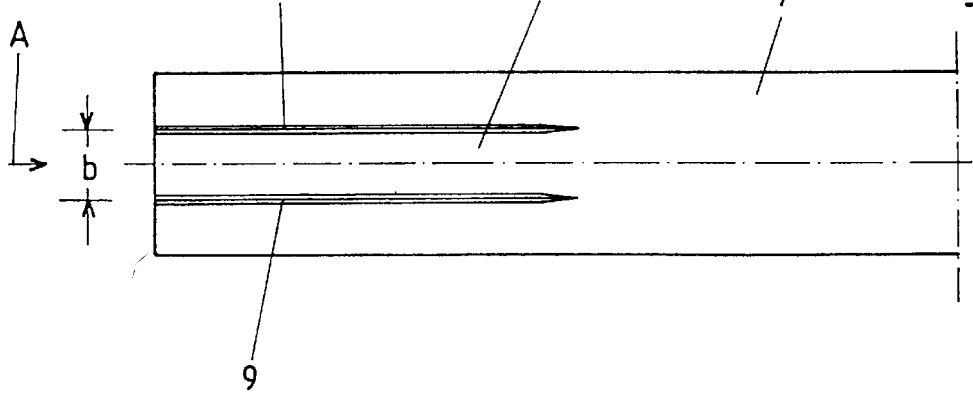
FIG. 3 is a plan view of a section of an inner tube.
Figure 4:
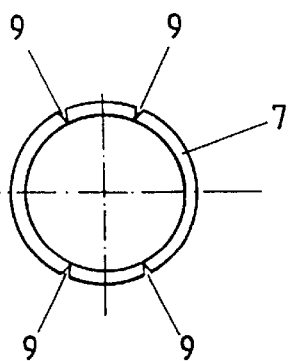
FIG. 4 is an end view of the inner tube shown in FIG. 3 viewed in the direction of arrow A.
Figure 12:
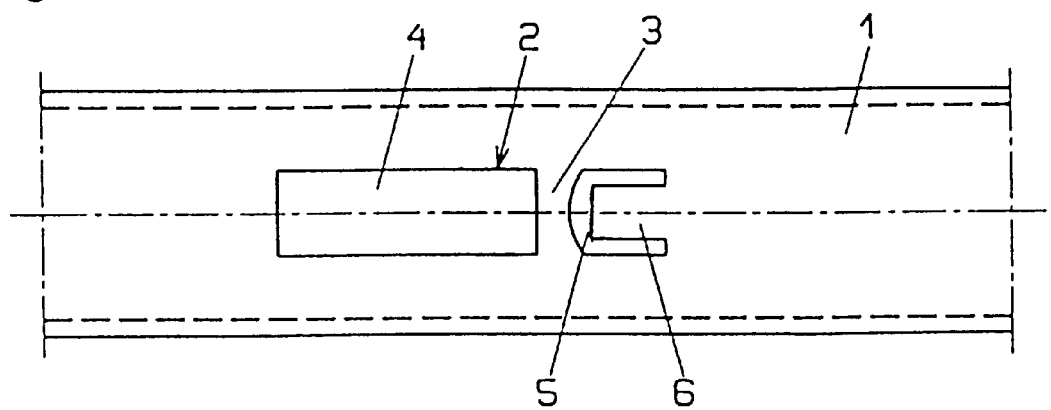
FIG. 12 is a plan view of the outer tube with an arcuate profile of the edge of the smaller cut-out section.
Figure 13:
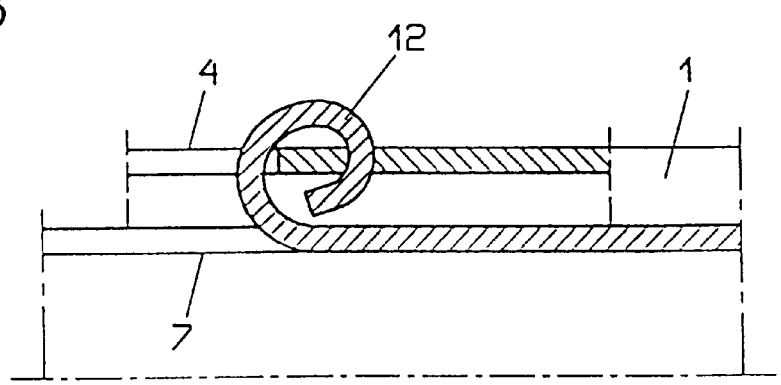
FIG. 13 is a partial cross-sectional view showing the formlocking connection of the two tubes formed according to the present invention.

In the embodiment of the formlocking connection shown in FIGS. 1–2, the limiting edges of the web 3, which extends perpendicular to the longitudinal extent of the outer tube 1, are shown to be straight and parallel to each other. However, it is also within the scope of the present invention to so form the web edge adjacent to the tongue 6 that the edge has, in the plan view, an arcuate or an angular profile, as shown in FIG. 12. By forming the tongue-adjacent web edge in this way, it is achieved that the strips 12 tightly abuts the web 3 without any clearance. According to a further development of the present invention, it is contemplated to further bent inward the free end of the strip 12 after it encompasses the web 3, as shown in FIG. 13. To this end a fork-shaped tool is used, which is inserted into the smaller section 5 of the cut-out 2. The fork-shaped tool receives the tongue 6 between the fork blades and is then displaced toward the stirps 12, effecting for inward bending of the strips 12 shown in FIG. 13. This step can be effected before or after the displacement of the tongue 6 downward into engagement with the strip 12.

The processes and tools used for preforming of the outer tube 1 and the inner tube 7 are very simple. Despite its simplicity, the formlocking connection of two tubes according to the present invention insures a reliable connection of the two tubes, without any circumferential backlash.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A formlocking connection of two telescopic tubes axially displaceable relative to each other upon being subjected to an action of an axial force exceeding a predetermined value, comprising:

two elongate cut-outs formed at two diametrically opposite locations in one of the two tubes, respectively, each of the two cut-outs being separated by at least one web dividing the cut-out in two sections; and least two strips formed in another of the two tubes at two diametrically opposite locations and rolled over the cut-out dividing webs as a result of a telescopic connection of the two tubes effected by pushing the two tubes toward each other, with the strips of the another of the two tubes being pressed against a forming tool inserted into the elongate cut-outs of the one of the two tubes.

2. A formlocking connection as set forth in claim 1, wherein the cut-outs are provided in an outer of the two tubes.

3. A formlocking connection as set forth in claim 1, wherein a width of the cut-outs is greater than the width of the strips.

4. A formlocking connection as set forth in claim 1, wherein a free end of a strip portion rolled over the web is additionally bent inward.

5. A formlocking connection of two telescopic tubes, comprising:

two elongate cut-outs formed at two diametrically opposite locations in one of the two tubes, respectively, each of the two cut-outs being separated by at least one web dividing the cut-out in two sections; and at least two strips formed in another of the two tubes at two diametrically opposite locations and rolled over the cut-out dividing webs as a result of a telescopic connection of the two tubes effected by pushing the two tubes toward each other, with the strips of the another of the two tubes being pressed against a forming tool inserted into the elongate cut-outs of the one of the two tubes, wherein the two sections of the cut-outs have unequal length.

6. A formlocking connection as set forth in claim 5, wherein the cut-out section having a smaller length includes a tongue facing the dividing web and engaging a respective strip.

7. A formlocking connection as set forth in claim 6, wherein a limiting edge of the web adjacent to the tongue has an arcuate profile.

8. A formlocking connection of two telescopic tubes, comprising:

two elongate cut-outs formed at two diametrically opposite locations in one of the two tubes, respectively, each of the two cut-outs being separated by at least one web dividing the cut-out in two sections; and at least two strips formed in another of the two tubes at two diametrically opposite locations and rolled over the cut-out dividing webs as a result of a telescopic connection of the two tubes effected by pushing the two tubes toward each other, with the strips of the another of the two tubes being pressed against a forming tool inserted into the elongate cut-outs of the one of tubes;

wherein each of the strips is limited on opposite longitudinal sides thereof by weakness regions extending from an end surface of the strip.

9. A formlocking connection as set forth in claim 8, wherein each of the weakness regions has a length exceeding a length of a portion of the strip rolled over the web.

10. A method of forming a formlocking connection of two telescopic tubes forming a steering column of a motor vehicle and axially displaceable relative to each other upon being subjected to an action of an axial force exceeding a predetermined value, the method comprising the steps of:

providing in one of the two tubes at two diametrically opposite locations, elongate cut-outs, with the cut-outs having an end side thereof limited by at least one web;

providing in another one of the two tubes at two diametrically opposite locations longitudinally extending strips extending from an end surface of the another one of the two tubes;

inserting into the elongate cut-outs of the one of the two tubes, a forming tool;

thereafter, telescopically connecting the two tubes and pushing the two tubes toward each other so that the strips are pressed against the forming tool which causes the strips to roll over the webs.

11. A method as set forth in claim 10, wherein the one of the two tubes is an outer tube.

12. A method of forming a formlocking connection of two telescopic tubes, the method comprising the steps of:

providing in one of the two tubes at two diametrically opposite locations, elongate cut-outs, with the cut-outs having an end side thereof limited by at least one web;

providing in another one of the two tubes at two diametrically opposite locations longitudinally extending strips extending from an end surface of the another one of the two tubes;

inserting into the elongate cut-outs of the one of the two tubes, a forming tool;

thereafter, telescopically connecting the two tubes and pushing the two tubes toward each other so that the strips are pressed against the forming tool which causes the strips to roll over the webs, wherein the web divides the cut-out into two sections having unequal length.

13. A method as set forth in claim 12, wherein the cut-out section having a smaller length includes a tongue facing the web and bent-out outwardly, the method further including the step of pressing the bent-out tongue against the strip rolled over the web.

14. A method of forming a formlocking connection of two telescopic tubes forming a steering column of a motor vehicle, the method comprising the steps of:

providing in one of the two tubes at two diametrically opposite locations, elongate cut-outs, with the cut-outs having an end side thereof limited by at least one web;

providing in another one of the two tubes at two diametrically opposite locations longitudinally extending strips extending from an end surface of the another one of the two tubes;

inserting into the elongate cut-outs of the one of the two tubes, a forming tool;

thereafter, telescopically connecting the two tubes and pushing the two tubes toward each other so that the strips are pressed against the forming tool which causes the strips to roll over the webs, wherein the strip providing step includes forming weakness regions limiting the strips, the strips being teared off along the weakness regions upon being pressed against the forming tool.

\* \* \* \* \*